United States Patent
Jones et al.

(10) Patent No.: US 8,785,779 B1
(45) Date of Patent: Jul. 22, 2014

(54) SNAP-IN RACEWAY

(75) Inventors: Timothy Mark Jones, Lake Stevens, WA (US); Mark Andrew Lewandowski, Arlington, WA (US)

(73) Assignee: The Boeing Company, Chicago, IL (US)

( * ) Notice: Subject to any disclaimer, the term of this patent is extended or adjusted under 35 U.S.C. 154(b) by 114 days.

(21) Appl. No.: 13/366,735

(22) Filed: Feb. 6, 2012

(51) Int. Cl.
*H02G 3/04* (2006.01)

(52) U.S. Cl.
USPC ......... 174/72 A; 174/480; 174/481; 248/68.1; 439/211

(58) Field of Classification Search
USPC ................. 174/72 A, 480, 481; 248/68.1, 62; 439/211
See application file for complete search history.

(56) References Cited

U.S. PATENT DOCUMENTS

| | | | |
|---|---|---|---|
| 4,317,549 A | 3/1982 | Thomas et al. | |
| 4,720,272 A | 1/1988 | Durand | |
| 4,815,984 A | 3/1989 | Sugiyama et al. | |
| 5,149,027 A * | 9/1992 | Weber | 248/68.1 |
| 6,923,407 B2 * | 8/2005 | Takeuchi | 248/73 |
| 7,053,305 B2 * | 5/2006 | Takase et al. | 174/72 A |
| 7,471,868 B2 * | 12/2008 | Bayazit et al. | 385/136 |
| 8,011,621 B2 | 9/2011 | Korczak | |
| 8,033,501 B2 * | 10/2011 | Callahan et al. | 244/118.6 |
| 8,157,222 B1 * | 4/2012 | Shirey et al. | 248/74.1 |
| 2011/0138698 A1 | 6/2011 | Neumann | |

* cited by examiner

*Primary Examiner* — Dhirubhai R Patel
(74) *Attorney, Agent, or Firm* — Yee & Associates, P.C.

(57) ABSTRACT

A method and apparatus having an elongate housing and connectors. The elongate housing has a channel configured to hold a number of lines. The connectors extend from a side of the elongate housing. The connectors are configured to engage channels formed in a surface of a structure such that the elongate housing is connected to the structure.

22 Claims, 11 Drawing Sheets

FIG. 13
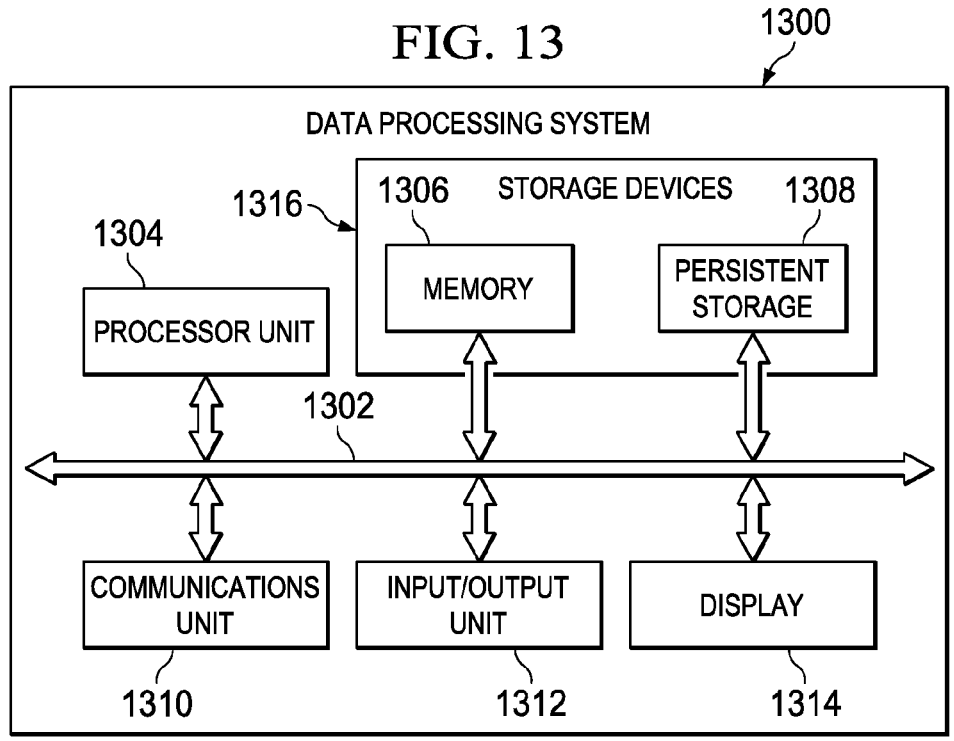
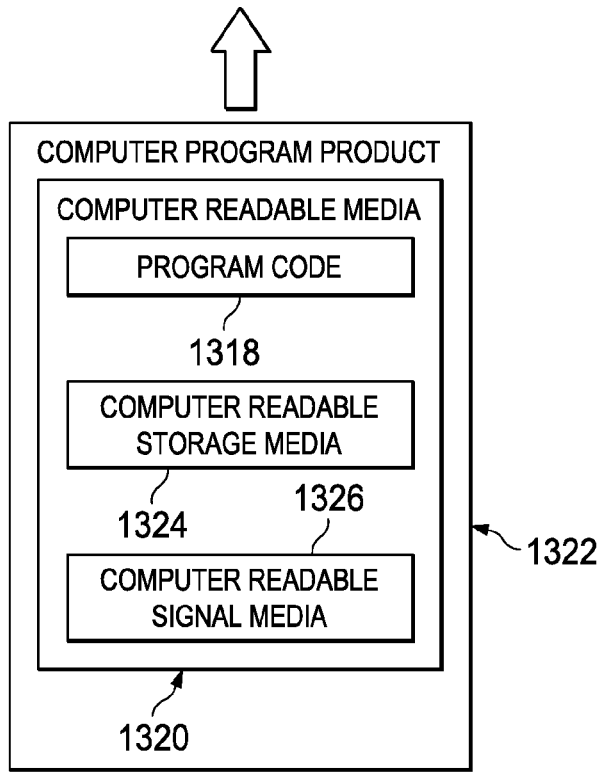

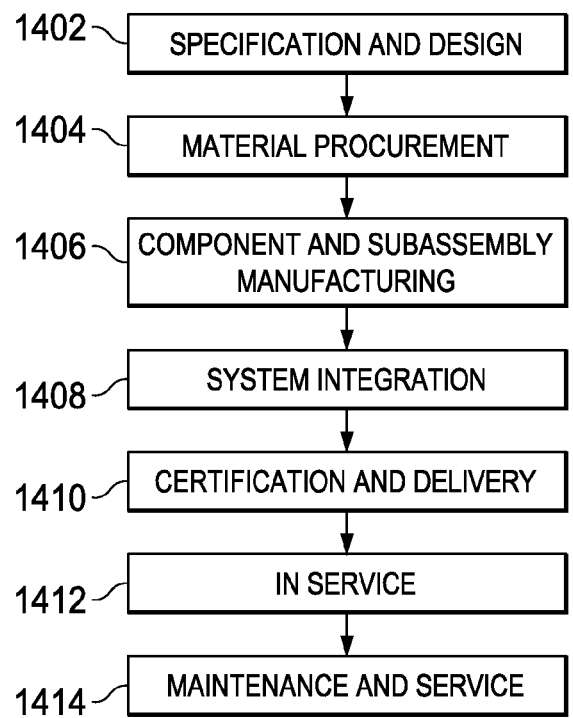
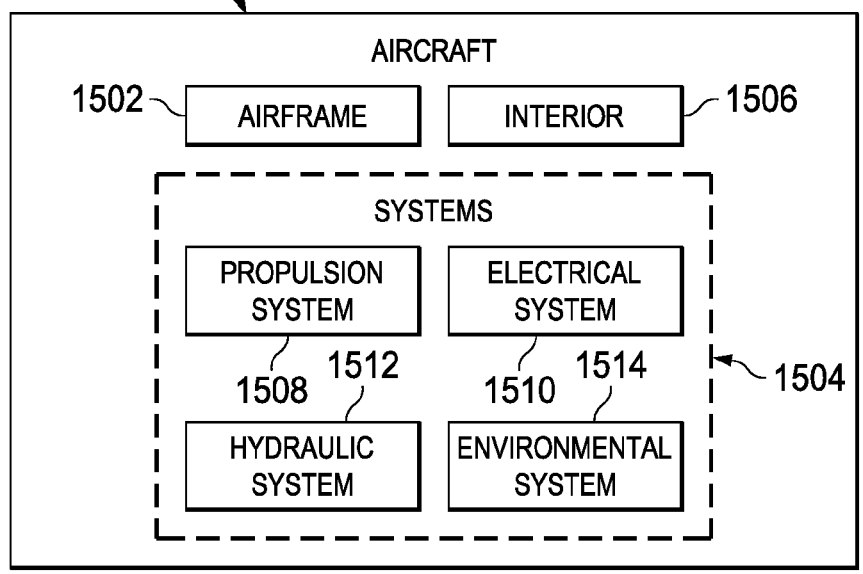

SNAP-IN RACEWAY

BACKGROUND INFORMATION

1. Field

The present disclosure relates generally to wiring systems and, in particular, to conduits for holding wires. Still more particularly, the present disclosure relates to a method and apparatus for connecting conduits to aircraft structures.

2. Background

An aircraft has many wires that extend through different parts of the fuselage, wing, and other sections of the aircraft. These wires may be used to distribute power, exchange data, or a combination of the two.

Wires that extend through the cabin of an aircraft are typically installed in a manner that hides the wires from being seen by passengers. For example, wires may extend through the crown of the cabin or under the floor of the cabin.

Further, wires may extend through different structures inside the aircraft. For example, wires may be present in monuments, such as closets, lavatories, galleys, and other types of structures.

The wires located in these and other monuments may provide power, data, or both to devices that may be present in or connected to the monuments. For example, a wire carrying electrical energy may extend into a closet to provide power to a light in the closet. As another example, a wire may extend through various closets to a station containing environmental controls.

When wires extend through monuments and other structures in the interior of the aircraft, it is desirable to reduce the visibility of these wires, protect the wires, or some combination of the two. In some cases, the structures may include channels through which the wires run. For example, a panel in a monument may have a channel through which a wire may extend. In this manner, the wire may be both protected and not visible to a passenger or other person. Although this type of conduit system for wires may be desirable, the cost for manufacturing panels with these conduits may be greater than desired.

In other cases, a raceway may be connected to the surface of the structure. A raceway is a conduit in which one or more wires may be located within the channel in the conduit. The raceway may be connected to the surface of a structure through the use of tape, fasteners, or some combination of the two.

For example, a raceway may be connected to the interior of a closet. This location reduces the visibility of the conduit, and the conduit provides protection for the wires. Currently, the installation of these raceways may be more time-consuming and tedious than desired.

Further, the raceway is connected to the surface of a structure with two-sided tape. The raceway may be further secured to the structure with a fastener system. Using these types of connection systems may be more time-consuming, expensive, and/or tedious than desired. Additionally, these types of connection systems may not hold the conduit as tight against the mating surface of the structure as desired.

Therefore, it would be desirable to have a method and apparatus that takes into account at least some of the issues discussed above as well as possibly other issues.

SUMMARY

In one illustrative embodiment, an apparatus comprises an elongate housing and connectors. The elongate housing has a channel configured to hold a number of lines. The connectors extend from a side of the elongate housing. The connectors are configured to engage channels formed in a surface of a structure such that the elongate housing is connected to the structure.

In another illustrative embodiment, a method of operating an aircraft is present. At least one of data, fluid, and power is transmitted through lines in the aircraft. The conduit comprises an elongate housing, connectors extending from the elongate housing, and a channel configured to hold the lines. The connectors are configured to engage channels formed in a surface of the structure in the aircraft such that the elongate housing is connected to the structure.

In yet another illustrative embodiment, a method for installing a conduit is present. Channels in a surface of a structure are identified. Connectors with the channels in the structure are engaged. The connectors extend from an elongate housing of a conduit that has a channel configured to hold a number of lines.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and characteristics thereof will best be understood by reference to the following detailed description of an illustrative embodiment of the present disclosure when read in conjunction with the accompanying drawings, wherein:

FIG. 13 is an illustration of a data processing system in accordance with an illustrative embodiment;

FIG. 14 is an illustration of an aircraft manufacturing and service method in accordance with an illustrative embodiment; and FIG. 15 is an illustration of an aircraft in which an illustrative embodiment may be implemented.

DETAILED DESCRIPTION

The different illustrative embodiments recognize and take into account one or more different considerations. For example, the illustrative embodiments recognize and take into account that the manner in which raceways are currently installed may be more tedious and time-consuming than desired. For example, the amount of time spent measuring and laying out raceway locations to match engineering drawings may be greater than desired.

Further, the different illustrative embodiments also recognize and take into account that the use of tape and plastic rivets to connect the raceway to the surface of a structure may not hold the edge of the raceway as tightly to the surface of the panel as desired. Further, the different illustrative embodiments recognize and take into account that with the use of tape and plastic rivets, the amount of parts needed to connect a raceway to a panel may be greater than desired.

The different illustrative embodiments also recognize and take into account that the installation of the raceway may result in the raceway being shifted from a desired position. For example, the installer measures the location for the raceway. The location may be marked. Thereafter, the raceway, with two-sided tape, is connected to the panel in the desired location. Thereafter, the raceway is manipulated to expose the interior of the raceway such that rivets may be installed to more securely connect the raceway to the panel. The different illustrative embodiments also recognize and take into account that the location of the raceway may shift from the desired position while the raceway is manipulated to install rivets.

Thus, one or more illustrative embodiments provide a method and apparatus for connecting conduits to desired locations. In one illustrative embodiment, an apparatus comprises a conduit and connectors. The conduit has a channel configured to hold a number of lines. The connectors extend from a side of the conduit. The connectors are configured to engage channels in the surface of a structure such that the conduit is connected to the structure.

As used herein, "a number of" with reference to items, means one or more items. For example, a number of lines is one or more lines. In these illustrative examples, a line may take different forms. For example, a line may be a wire, a power line, a data line, a cable, an optical fiber, a fluid line, or some other suitable type of line.

Figure 1:
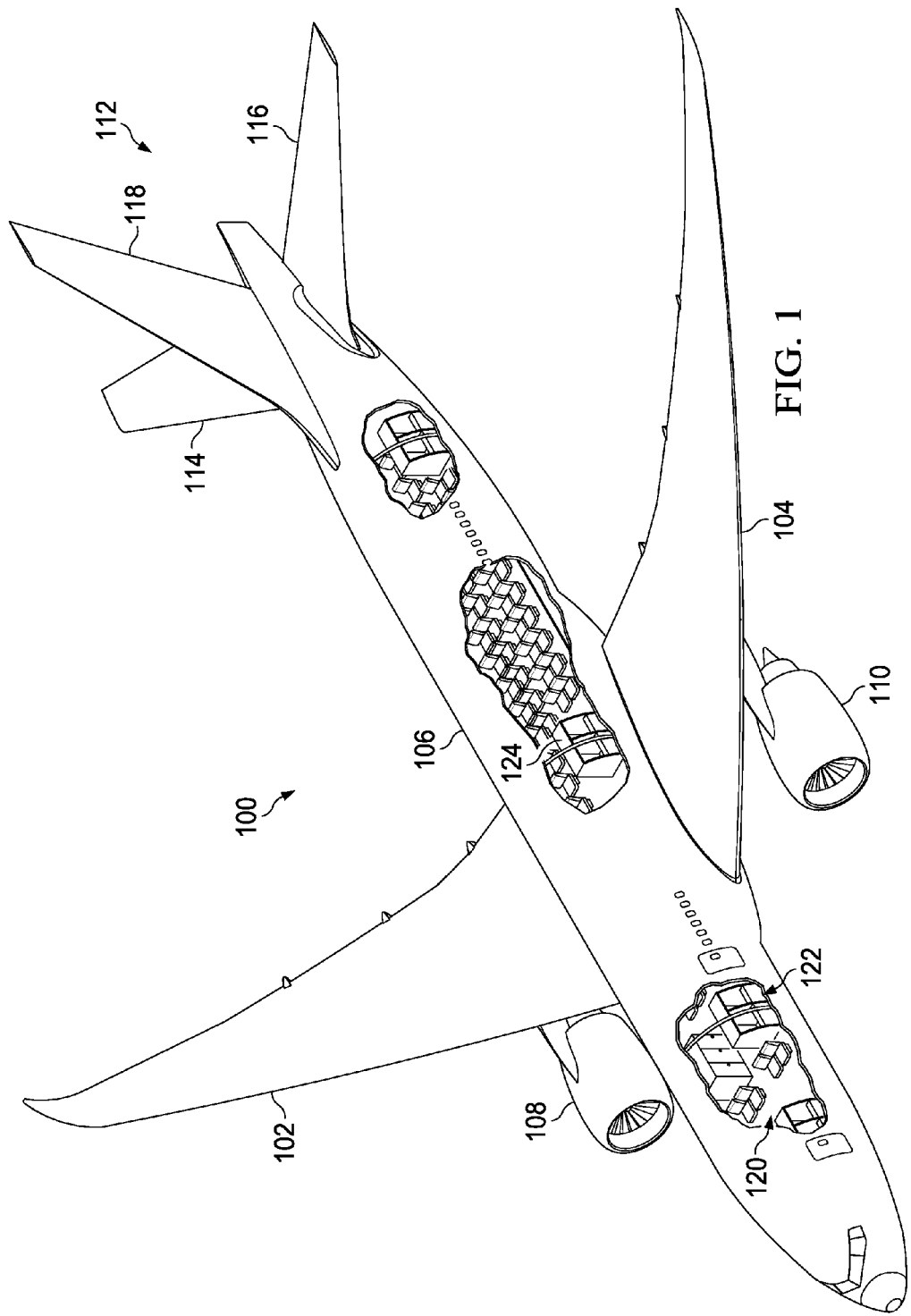
FIG. 1 is an aircraft in accordance with an illustrative embodiment.

With reference now to the figures and, in particular, with reference to FIG. 1, an aircraft is depicted in accordance with an illustrative embodiment. In this illustrative example, aircraft 100 has wing 102 and wing 104 connected to body 106. Aircraft 100 also includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

In this illustrative example, aircraft 100 is an aircraft in which an illustrative embodiment may be implemented to hold lines within aircraft 100. Various lines may extend within body 106 of aircraft 100. Lines may extend through various locations of interior 120 of aircraft 100.

One or more illustrative embodiments may be used to hold lines in place on structures 122 within interior 120 of aircraft 100. For example, an illustrative embodiment may be implemented to hold one or more lines on the interior of closet 124 in structures 122.

Figure 2:
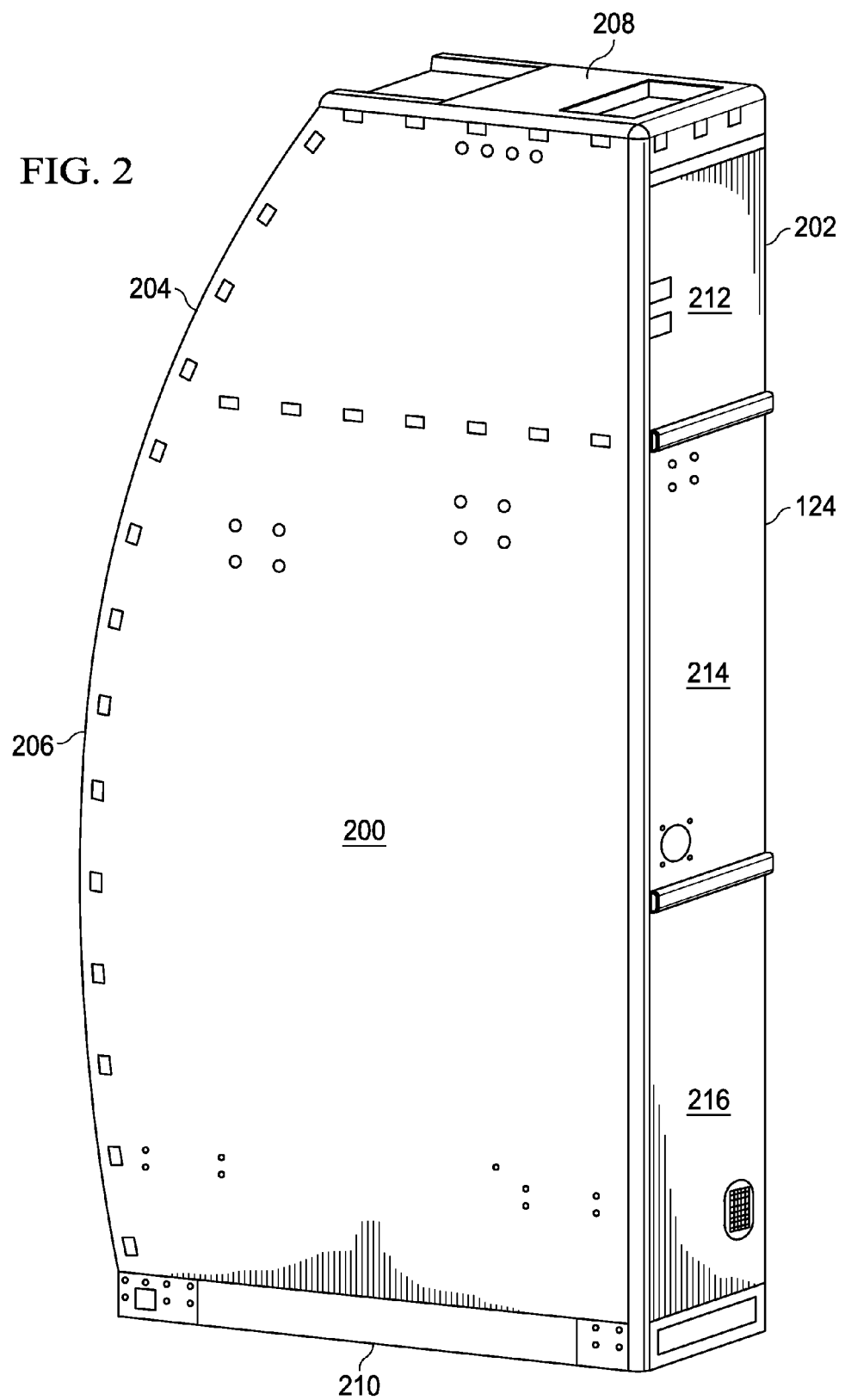
FIG. 2 is a detailed illustration of a closet in accordance with an illustrative embodiment.

Turning next to FIG. 2, a more-detailed illustration of closet 124 is depicted in accordance with an illustrative embodiment. In this illustrative example, closet 124 may be formed from panel 200, panel 202, panel 204, and panel 206 connected to top structure 208 and base structure 210. Closet 124 also has door 212, door 214, and door 216. In these illustrative examples, panel 200, panel 202, panel 204, and panel 206 may be comprised of composite panels. One or more illustrative embodiments may be used to hold lines, such as wires, inside closet 124. Placing the lines within closet 124 may hide these lines from the view of passengers or other personnel. This placement of lines within closet 124 may be more aesthetically pleasing to passengers.

Figure 3:
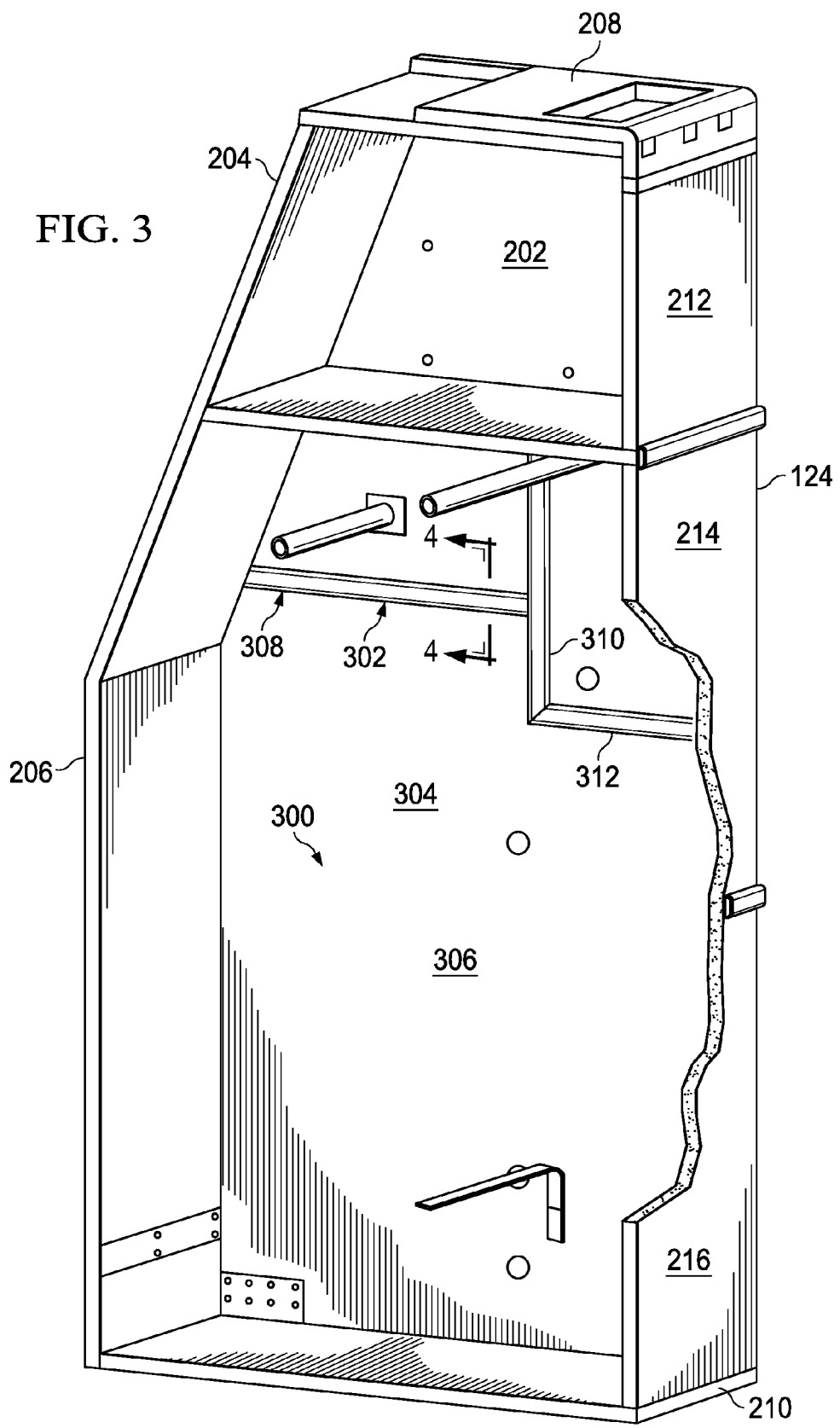
FIG. 3 is an illustration of an exposed view of a closet in accordance with an illustrative embodiment.

With reference now to FIG. 3, an illustration of an exposed view of a closet is depicted in accordance with an illustrative embodiment. In this depicted example, an exposed view of closet 124 is shown such that interior 300 of closet 124 may be seen. In this illustrative example, conduit system 302 is shown connected to surface 304 of panel 202. In this illustrative example, panel 202 takes the form of composite panel 306. In this illustrative example, conduit system 302 comprises conduit 308, conduit 310, and conduit 312. These conduits may hold lines inside of closet 124.

Figure 4:
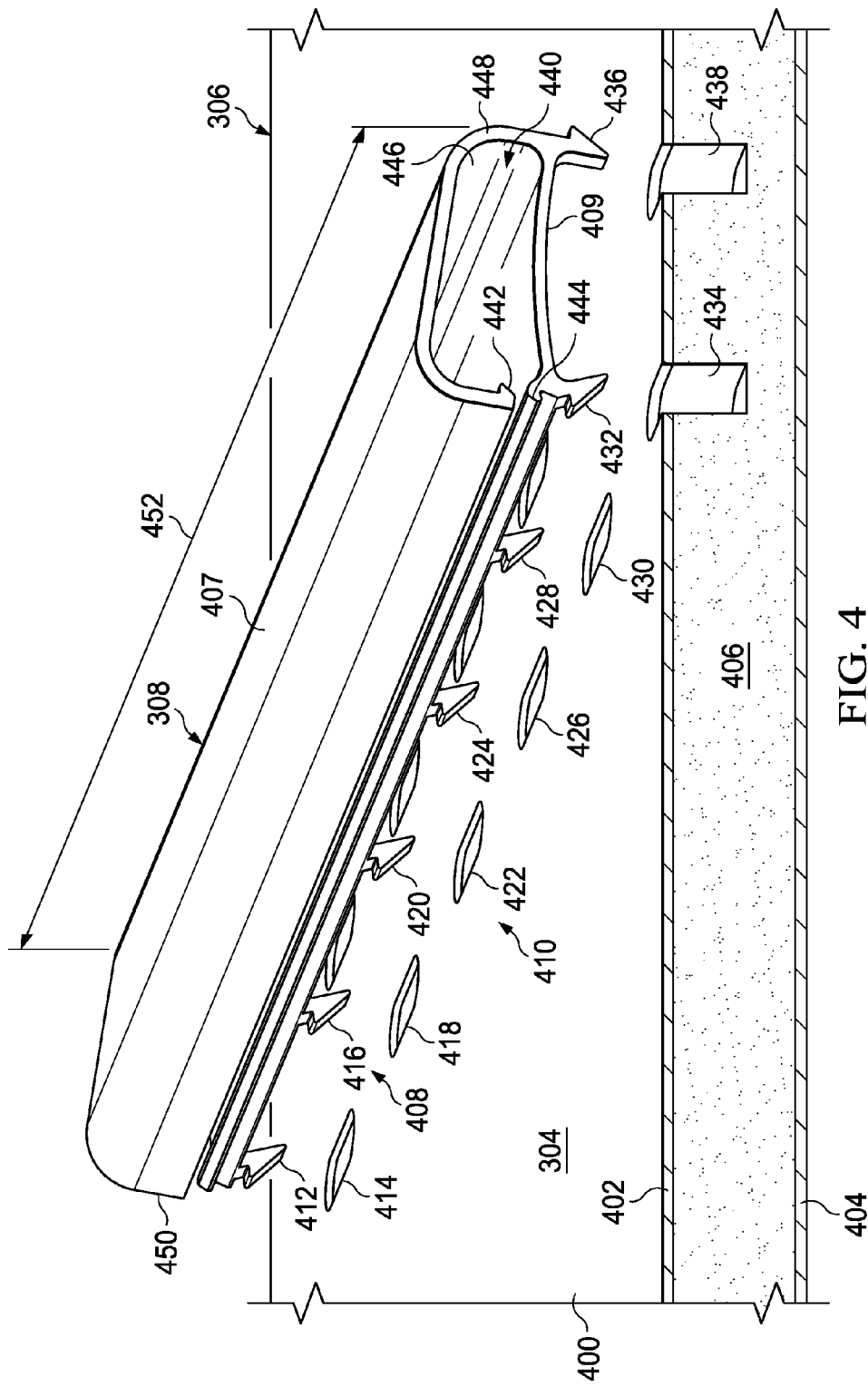
FIG. 4 is an illustration of a conduit detached from a composite panel in accordance with an illustrative embodiment.

Turning next to FIG. 4, an illustration of a conduit detached from a composite panel is depicted in accordance with an illustrative embodiment. As depicted, a view of composite panel 306 with conduit 308 detached from composite panel 306 in a perspective cross-sectional view is depicted as taken along lines 4-4 in FIG. 3.

As can be seen, composite panel 306 has outer layer 400. In these illustrative examples, outer layer 400 is an outer layer of material and is first face sheet 402. Additionally, second face sheet 404 is present with core 406 being located between first face sheet 402 and second face sheet 404 to form composite panel 306.

In these illustrative examples, first face sheet 402 and second face sheet 404 may be comprised of a composite material. For example, these face sheets may be comprised of fibers impregnated with resin. Core 406 has walls configured in a honeycomb structure in these illustrative examples.

In this illustrative example, conduit 308 comprises elongate housing 407 and connectors 408. As depicted, connectors 408 extend from side 409 of elongate housing 407.

Connectors 408 are configured to engage channels 410 formed in composite panel 306. In particular, in being configured to engage channels 410, connectors 408 are configured to engage outer layer 400 in channels 410, which is first face sheet 402. This engagement holds elongate housing 407 of conduit 308 in place on surface 304 of composite panel 306. For example, connector 412 may be placed into channel 414 to engage outer layer 400. In a similar fashion, connector 416 may be placed into and engage channel 418, connector 420 may be placed into and engage channel 422, connector 424 may be placed into and engage channel 426, connector 428 may be placed into and engage channel 430, connector 432 may be placed into and engage channel 434, and connector 436 may be placed into and engage channel 438.

In these illustrative examples, channels 410 are depicted as having a rectangular or slotted shape. In other words, a cross-sectional shape of a channel in channels 410 is a rectangle in this illustrative example. Of course, channels 410 may have other shapes in other illustrative examples. For example, channels 410 may have a circular shape, an oval shape, and other suitable shapes, depending on the particular implementation.

In these illustrative examples, elongate housing 407 of conduit 308 has channel 440. Channel 440 may receive and hold lines inside of conduit 308.

In these illustrative examples, elongate housing 407 is comprised of flexible material and may be manipulated to separate first edge 442 from second edge 444 such that lines may be placed into conduit 308 more easily. As depicted, first edge 442 is configured to engage second edge 444. The engagement of first edge 442 and second edge 444 with each other may hold or lock these edges to each other such that wires may not fall out of channel 440. Of course, wires may be placed into channel 440 in other ways. For example, wires may be placed into channel 440 through opening 446 at end 448 of elongate housing 407 of conduit 308. In a similar fashion, lines also may be placed into an opening (not shown) at end 450 of elongate housing 407 of conduit 308.

Conduit 308 has length 452. In this illustrative example, length 452 may be, for example, without limitation, about 10 inches, about two feet, about 10 feet, or some other suitable length.

Figure 5:
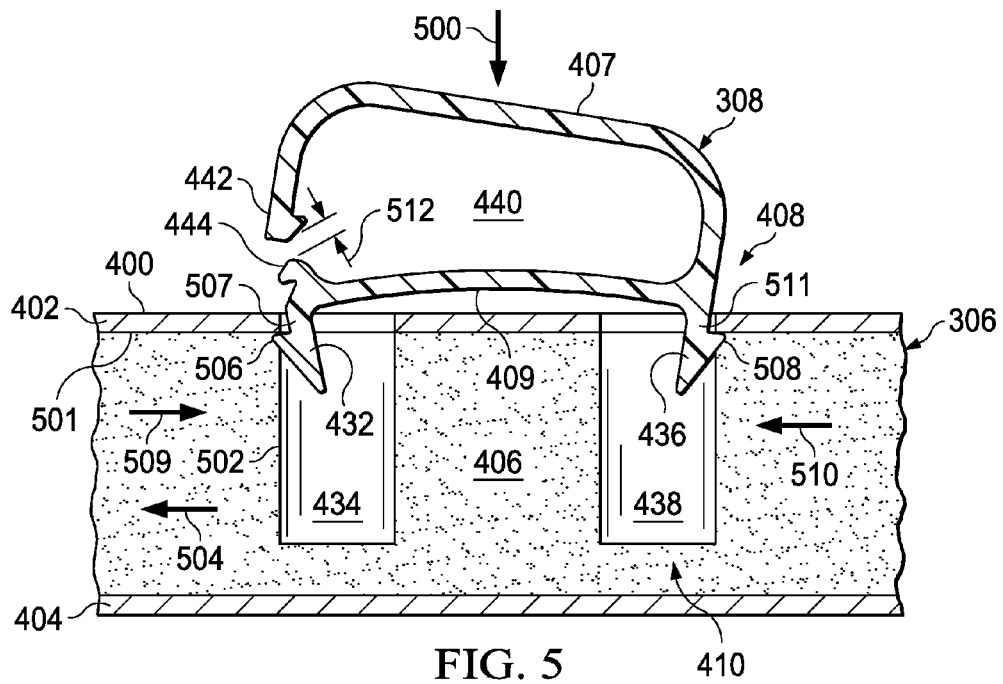
FIG. 5 is a cross-sectional view of a composite panel with a conduit in accordance with an illustrative embodiment.

Turning next to FIG. 5, a cross-sectional view of a composite panel with a conduit is depicted in accordance with an illustrative embodiment. In this illustrative example, a cross-sectional view of composite panel 306 with conduit 308 is depicted taken along lines 4-4 in FIG. 3.

In this illustrative example, connectors 408 extending from elongate housing 407 are engaged with channels 410. In particular, connectors 408 are engaged to outer layer 400 in channels 410. As described herein, outer layer 400 is first face sheet 402 for composite panel 306. This engagement may occur when connectors 408 are aligned with channels 410 and conduit 308 is moved toward composite panel 306 in the direction of arrow 500.

As can be seen in this illustrative example, connector 432 is located in channel 434 and engaged with channel 434. This engagement occurs with connector 432 being engaged to surface 501 of outer layer 400. As can be seen in this illustrative example, walls 502 of channel 434 may be pushed in the direction of arrow 504. In particular, core 406 is comprised of a deformable material that may deform in at least the direction of arrow 504 when connector 432 moves into channel 434 in the direction of arrow 500.

In this illustrative example, connector 432 has protruding structure 506 on member 507. Protruding structure 506 and member 507 are configured such that protruding structure 506 engages surface 501 of outer layer 400, which is first face sheet 402. In particular, member 507 has a length that allows protruding structure 506 to engage surface 501 with a desired level of tightness to hold elongate housing 407 in place when connected to composite panel 306. Protruding structure 506 may take the form of a hook, tab, or other suitable structure that is configured to engage surface 501 or any other structure within channel 434.

As can be seen in this illustrative example, protruding structure 508 is on member 511. This combination of protruding structure 508 and member 511 for connector 436 engages surface 501 of first face sheet 402 in channel 438 in a similar fashion to protruding structure 506 and member 507 for connector 432.

With this configuration, connector 432 and connector 436 also may be disengaged from channel 434 and channel 438, respectively, in a manner that allows these connectors to be reused. For example, conduit 308 is flexible such that force in the direction of arrow 509, in the direction of arrow 510, or both may cause connector 432 and connector 436 to be disengaged from channel 434 and channel 438, respectively. With this disengagement, these connectors remain intact and may be reused if conduit 308 is reconnected to composite panel 306 or to another composite panel.

In this manner, conduits, such as conduit 308, may be reusable. For example, if a wiring configuration of aircraft 100 in FIG. 1 changes, conduits may be removed, moved, added, or some combination thereof. Also, when some conduits are not needed in aircraft 100, those conduits may be reused in another aircraft or platform.

In this illustrative example, gap 512 is present between first edge 442 and second edge 444. Gap 512 may be increased in size to place or remove lines from within channel 440 of conduit 308. These lines may be placed into conduit 308 now that conduit 308 has been connected to composite panel 306. Of course, lines may be placed into conduit 308 prior to connecting conduit 308 to composite panel 306, depending on the particular implementation.

Figure 6:
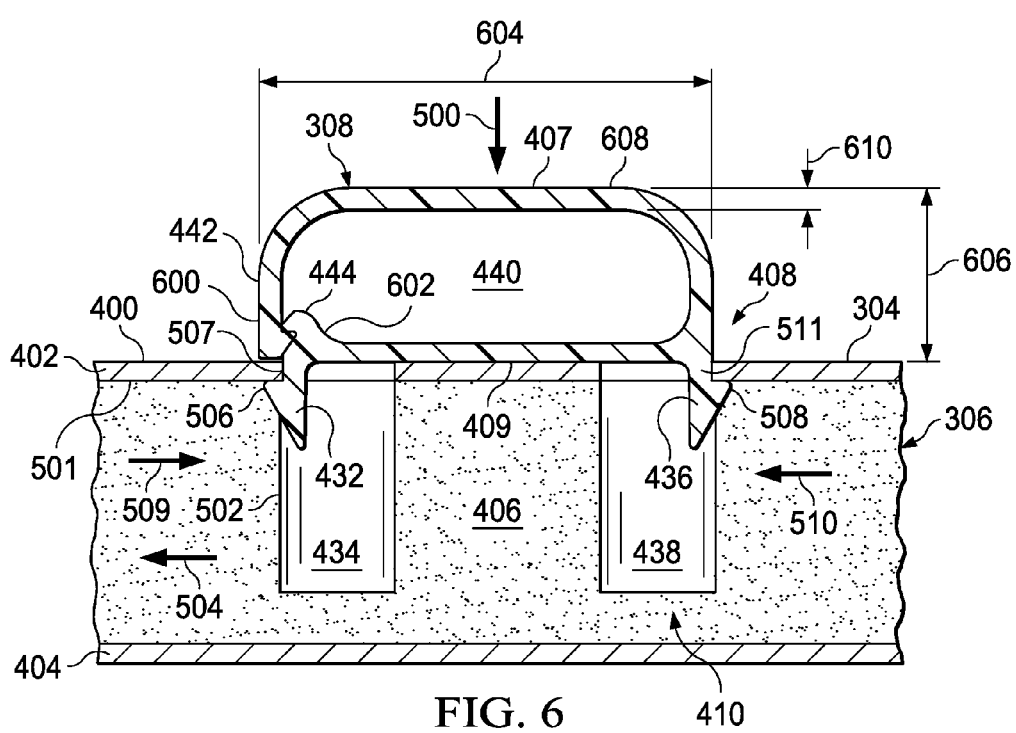
FIG. 6 is a cross-sectional view of a composite panel with a conduit in accordance with an illustrative embodiment.

Turning next to FIG. 6, a cross-sectional view of a composite panel with a conduit is depicted in accordance with an illustrative embodiment. In this illustrative example, conduit 308 is shown connected to composite panel 306 in a cross-sectional view taken along lines 4-4 in FIG. 3.

In this depicted example, first edge 442 and second edge 444 are engaged with each other in a manner that causes channel 440 to be a closed channel. As can be seen in this illustrative example, first edge 442 has protruding structure 600 and second edge 444 has protruding structure 602. These protruding structures may engage each other to cause first edge 442 to be engaged with second edge 444. In other words, these edges may be "locked" to each other using these protruding structures. These structures also may take the form of hooks that are configured to engage each other.

With connectors 408 in FIG. 4, elongate housing 407 may be held against surface 304 of composite panel 306 as tightly as desired. For example, elongate housing 407 of conduit 308 may be held against composite panel 306 such that elongate housing 407 does not rattle or vibrate relative to composite panel 306 during operation of aircraft 100 in FIG. 1. This fit may be accomplished through the configuration of connectors 408.

In this illustrative example, elongate housing 407 has width 604 and height 606. Width 604 may be about 1.25 inches. Height 606 may be about 0.5 inches. Further, wall 608 of elongate housing 407 has thickness 610. Thickness 610 may be about 0.05 inches. Of course, the values for these dimensions are only presented as examples of dimensions that may be used in an illustrative embodiment and are not meant to limit what values these dimensions may have in other illustrative embodiments.

The illustration of conduit system 302 for closet 124 in FIGS. 3-6 is not meant to imply physical or architectural limitations to the manner in which different illustrative embodiments may be implemented. For example, in other illustrative embodiments, conduit system 302 may be used in composite panels for a lavatory, a galley, a crown of the aircraft, the floor of the cabin, and other suitable locations or types of monuments.

Further, in other illustrative examples, the face sheets may be comprised of types of materials other than composite materials. Instead, the face sheets may be comprised of, for example, without limitation, aluminum, wood, or other suitable types of materials in forming composite panel 306.

In yet other illustrative examples, connectors 408 may engage channels 410 in other ways other than engaging first face sheet 402. For example, without limitation, connectors 408 may be configured to engage walls of core 406 in channels 410. With this example, connectors 410 may take the form of hooks and are configured to penetrate and/or otherwise engage core 406 in channels 410.

Figure 7:
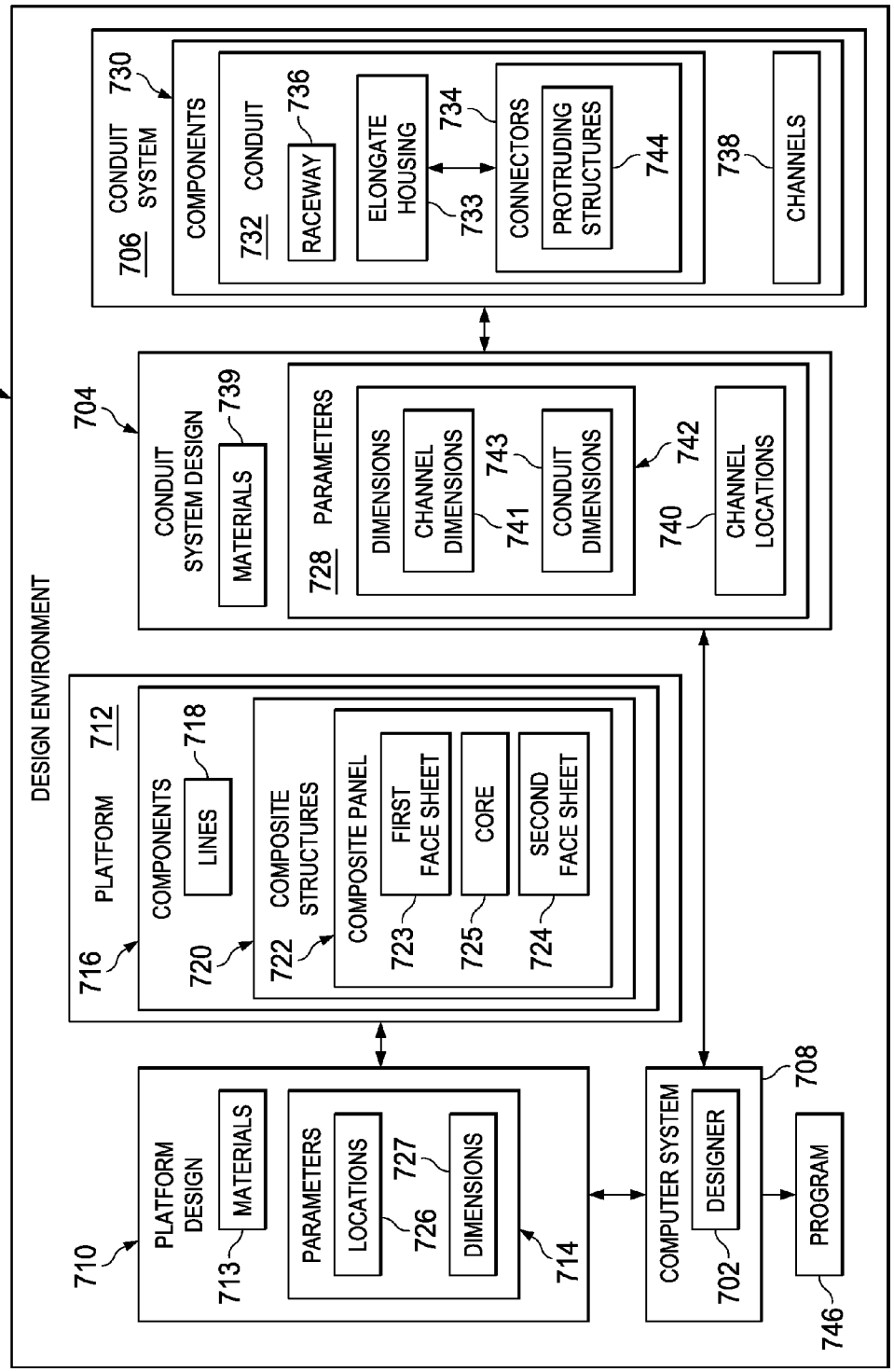
FIG. 7 is an illustration of a block diagram of a design environment in accordance with an illustrative embodiment.

With reference now to FIG. 7, an illustration of a block diagram of a design environment is depicted in accordance with an illustrative embodiment. In this depicted example, design environment 700 may be used to design a conduit system for use in a platform, such as aircraft 100 in FIG. 1.

As depicted, designer 702 may generate conduit system design 704 for conduit system 706. As depicted, designer 702 may be implemented in hardware, software, or a combination of the two. In particular, designer 702 may be implemented within computer system 708. Computer system 708 is one or more computers. When more than one computer is present in computer system 708, those computers may be in communication with each other.

In these illustrative examples, designer 702 may generate conduit system design 704 using platform design 710 for platform 712 as an input. In these illustrative examples, platform design 710 may be for platform 712 in the form of aircraft 100.

As depicted, platform design 710 may include materials 713 and parameters 714 for components 716. These components may include lines 718 and composite structures 720 within platform 712. One example of a composite structure in composite structures 720 is composite panel 722. Other examples of composite structures may be a closet, a wall, a ceiling, and other suitable structures.

Materials 713 may specify materials for composite panel 722. For example, materials 713 may identify materials used in first face sheet 723, second face sheet 724, and core 725.

For example, first face sheet 723 and second face sheet 724 may be fiberglass impregnated with resin, carbon fiber impregnated with resin, aluminum, wood, plastic, and other suitable materials. When resins are present in the materials, the resins may be one of a thermoplastic resin, a thermoset resin, an epoxy, and other suitable types of materials. First face sheet 723 and second face sheet 724 may be comprised of the same type of materials or different types of materials.

Core 725 may comprised of, for example, paper, wood, syntactic foam, polyurethane, polyethylene, polystyrene, and other suitable materials. Core 725 may be a deformable material having cells or may be in a honeycomb structure. As depicted, parameters 714 may include locations 726 for lines 718, dimensions 727 for composite panel 722, and other types of parameters.

Designer 702 may generate parameters 728 for components 730 in conduit system 706. In these illustrative examples, components 730 may include conduit 732. As depicted, conduit 732 is comprised of elongate housing 733 and connectors 734. Conduit 732 may take the form of raceway 736. Components 730 also may include channels 738. Channels 738 are channels to be formed in composite structures 720. One or more of channels 738 may be formed in composite panel 722. Materials 739 and parameters 728 are present for conduit 732.

Materials 739 may define materials for elongate housing 733 and connectors 734. For example, materials 739 for elongate housing 733 may be selected from at least one of a plastic, polyvinyl chloride, polypropylene, nylon, polyethylene, a metal, aluminum, a rigid material, a flexible material, and other suitable types of materials. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. Connectors 734 may be made of the same type or a different type of material as elongate housing 733.

For example, both elongate housing 733 and connectors 734 may be comprised of a flexible material. In some illustrative examples, elongate housing 733 may be comprised of a rigid material, while connectors 734 are comprised of a flexible material.

For example, parameters 728 may include dimensions 742 and channel locations 740. Dimensions 742 may include channel dimensions 741. Channel dimensions 741 may include, for example, a depth of channels 738, a shape for channels 738, a width, a length, a diameter, or some other dimension for channels 738. Additionally, dimensions 742 in parameters 728 also include conduit dimensions 743 for elongate housing 733 and connectors 734. Conduit dimensions 743 may include, for example, without limitation, lengths and widths for conduit 732, thicknesses for walls of conduit 732, as well as other dimensions. For example, conduit dimensions 743 for connectors 734 may be selected such that connectors 734 are configured to engage channels 738. For example, conduit dimensions 743 may include dimensions for protruding structures 744 in connectors 734.

Further, channel dimensions 741 for channels 738 also may be selected based on connectors 734 or dimensions 727 of composite panel 722. Conduit system design 704 may be used to manufacture conduit 732 with connectors 734. Further, conduit system design 704 also may be used in manufacturing composite panel 722 with channels 738. Conduit system design 704 may be placed into platform design 710 in some illustrative examples.

In still other illustrative examples, conduit system design 704 may be used to generate program 746. Program 746 may be used by a numerical control machine to form channels in composite panels. Additionally, program 746 also may be used in a manufacturing environment to fabricate conduit system 706.

Figure 8:
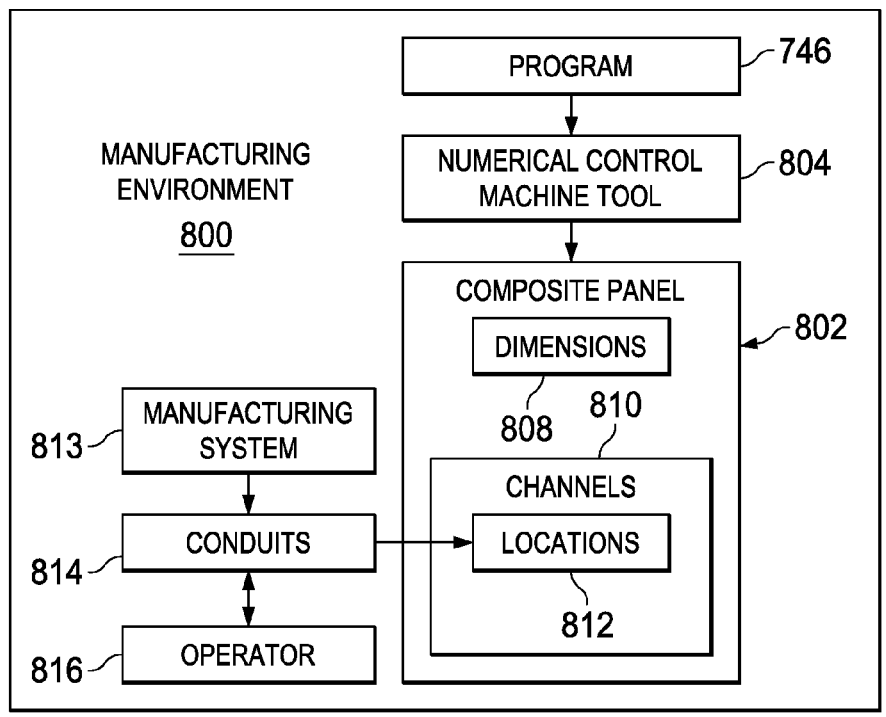
FIG. 8 is an illustration of a block diagram of a manufacturing environment in accordance with an illustrative embodiment.

Turning next to FIG. 8, an illustration of a block diagram of a manufacturing environment is depicted in accordance with an illustrative embodiment. In this illustrative example, manufacturing environment 800 may be used to manufacture composite panel 802. Composite panel 802 may be a composite panel for a composite structure in aircraft 100 in FIG. 1. In this illustrative example, numerical control machine tool 804 may receive program 746 generated by designer 702 in FIG. 7.

Numerical control machine tool 804 is a computer-controlled tool in these illustrative examples. Numerical control machine tool 804 may be, for example, without limitation, a milling machine, a router, a laser cutter, or some other suitable type of tool.

Program 746 may be generated using conduit system design 704 for use in forming composite panel 802. For example, program 746 may be used to cut composite panel 802 to have dimensions 808. Further, program 746 also may be run by numerical control machine tool 804 to form channels 810 in composite panel 802. Channels 810 are formed in locations 812 in composite panel 802. Locations 812 for channels 810 are such that connectors for conduits may be placed into channels 810 and engage channels 810.

This type of manufacturing of composite panel 802 may reduce time, effort, and expense needed to install conduit systems. By forming channels 810 in locations 812 in composite panel 802, conduits may be placed into the desired locations for a line system without the installer needing to make measurements on composite panel 802 for each location to install the conduits.

Manufacturing system 813 may manufacture conduits 814 for installation on composite panel 802. Manufacturing system 813 may have one or more different types of processes for manufacturing conduits 814. For example, without limitation, manufacturing system 813 may employ injection molding processes, extrusion processes, and other suitable processes for forming conduits 814. Additionally, manufacturing system 813 also may use machining processes that are used with other processes to form conduits 814.

After composite panel 802 and conduits 814 have been formed, operator 816 may install a number of conduits 814 on composite panel 802. The number of conduits 814 may be installed based on locations 812 of channels 810. This installation of the number of conduits 814 may be made without operator 816 making measurements based on engineering designs or drawings. Further, the installation of the number of conduits 814 may be performed without the need for applying two-sided tape and using fasteners.

The illustration of design environment 700 in FIG. 7 and manufacturing environment 800 in FIG. 8 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some implementations, computer system 708 may control numerical control machine tool 804 rather than using program 746. The control of numerical control machine tool 804 by computer system 708 may be performed using conduit system design 704.

As another illustrative example, channels 810 may be formed by another tool other than numerical control machine tool 804 after composite panel 802 has been manufactured. For example, channels 810 may be formed in composite panel 802 prior to or after the installation of composite panel 802 in platform 712.

Although platform 712 has been described as aircraft 100, platform 712 may take other forms. For example, without limitation, other illustrative embodiments may be applied to a mobile platform, a stationary platform, a land-based structure, an aquatic-based structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable platform.

As another illustrative example, the different illustrative embodiments may be applied to structures other than composite structures. For example, the structure may be comprised of a deformable material, and the connectors may engage the deformable material within the channels. The connectors may include hooks or barbs that engage the deformable material in the walls of the channels of the structure. In other examples, the face sheets and the core may be comprised of a single material. In other examples, the structure may be comprised of a plurality of layers of material without a "core".

The different components shown in FIGS. 1-6 may be combined with components in FIGS. 7-8, used with components in FIGS. 7-8, or a combination of the two. Additionally, some of the components in FIGS. 1-6 may be illustrative examples of how components shown in block form in FIGS. 7-8 can be implemented as physical structures.

Figure 9:
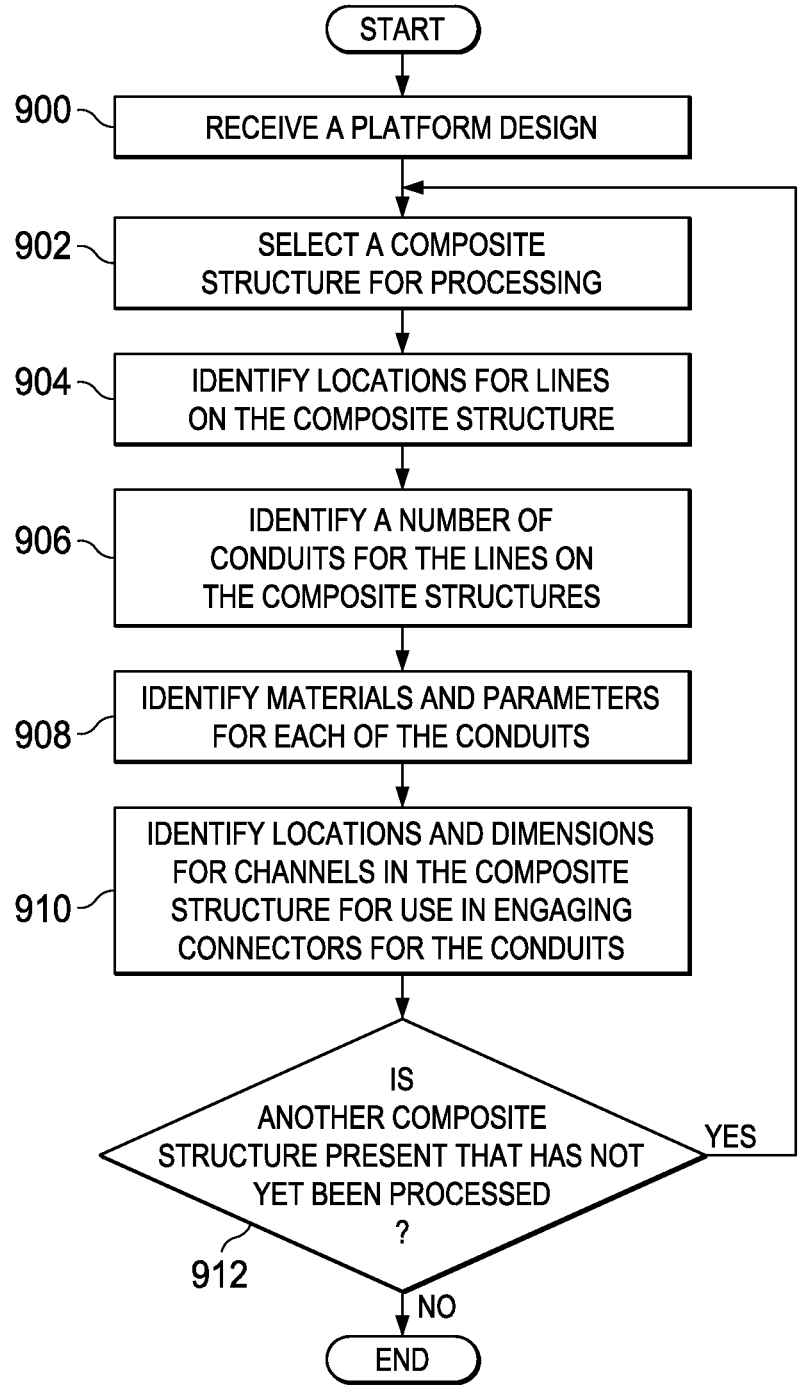
FIG. 9 is an illustration of a flowchart of a process for designing a conduit system in accordance with an illustrative embodiment.

Turning next to FIG. 9, an illustration of a flowchart of a process for designing a conduit system is depicted in accordance with an illustrative embodiment. This process may be implemented in designer 702 in FIG. 7 to generate conduit system design 704.

The process begins by receiving a platform design (operation 900). The platform design includes parameters for components in the platform on which lines may be connected to using conduits. For example, the components may be composite structures, such as composite panels, on which lines may be placed.

The process then selects a composite structure for processing (operation 902). The process identifies locations for lines on the composite structure (operation 904). Based on the locations identified for the lines, the process identifies a number of conduits for the lines on the composite structures (operation 906). The process then identifies materials and parameters for each of the conduits (operation 908).

Thereafter, the process identifies locations and dimensions for channels in the composite structure for use in engaging connectors for the conduits (operation 910). The process then determines whether another composite structure is present that has not yet been processed (operation 912). If another composite structure is present, the process returns to operation 902. Otherwise, the process terminates.

Figure 10:
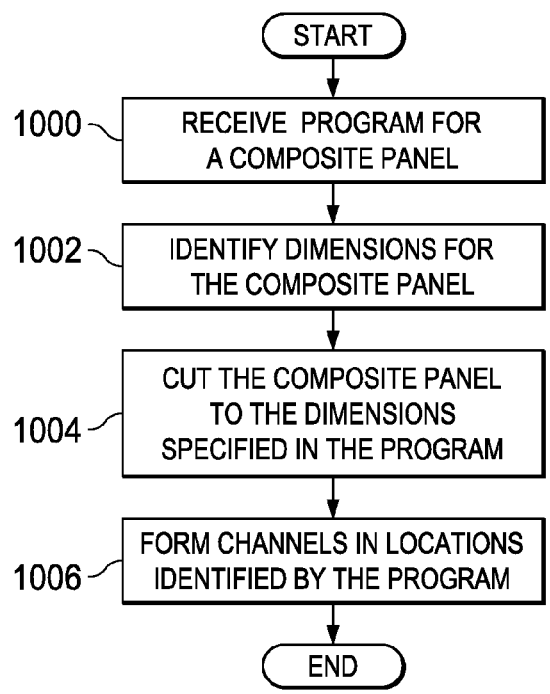
FIG. 10 is an illustration of a flowchart of a process for manufacturing a composite panel in accordance with an illustrative embodiment.

Turning now to FIG. 10, an illustration of a flowchart of a process for manufacturing a composite panel is depicted in accordance with an illustrative embodiment. This process may be implemented in manufacturing environment 800 in FIG. 8 and, in particular, the process may be implemented using numerical control machine tool 804.

The process begins by receiving a program for a composite panel (operation 1000). This program may be, for example, program 746 in FIG. 7. The program may identify dimensions for the composite panel (operation 1002).

The process then cuts the composite panel to the dimensions specified in the program (operation 1004). Thereafter, the process forms channels in locations identified by the program (operation 1006), with the process terminating thereafter.

Figure 11:
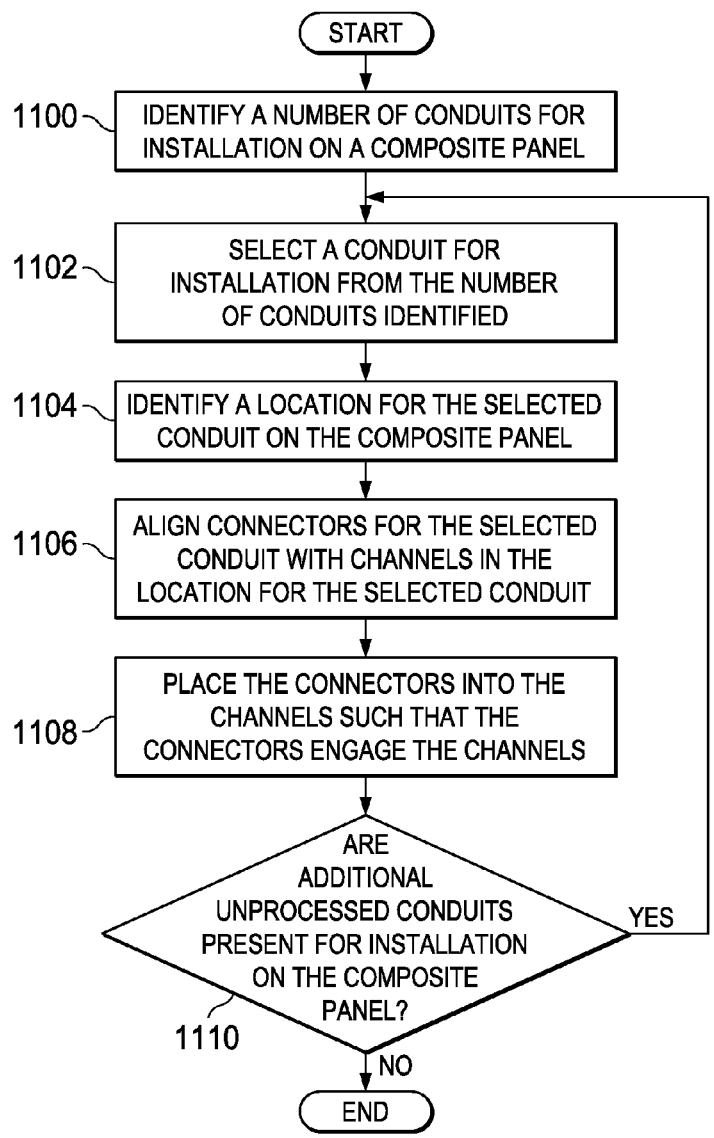
FIG. 11 is an illustration of a flowchart of a process for installing a conduit in accordance with an illustrative embodiment.

With reference now to FIG. 11, an illustration of a flowchart of a process for installing a conduit is depicted in accordance with an illustrative embodiment. This process may be implemented in manufacturing environment 800 in FIG. 8 to install a conduit on a composite panel.

The process begins by identifying a number of conduits for installation on a composite panel (operation 1100). The process then selects a conduit for installation from the number of conduits identified (operation 1102). The process identifies a location for the selected conduit on the composite panel (operation 1104). This location may be identified based on the position of channels in the composite panel. The locations that correspond to the conduit may be identified from a conduit system design, such as conduit system design 704.

Connectors for the selected conduit are aligned with channels in the location for the selected conduit (operation 1106). The connectors are then placed into the channels such that the connectors engage the channels (operation 1108).

A determination is made as to whether additional unprocessed conduits are present for installation on the composite panel (operation 1110). If additional unprocessed conduits are present, the operation returns to operation 1102. Otherwise, the process terminates.

Lines, such as wires or optical fibers, may be installed in the conduits as they are installed on the composite panel or after all of the conduits have been installed. As can be seen, this process requires fewer operations to be performed by the operator. In these illustrative examples, the operator installing the conduits may be a human operator or may be a machine, such as a computer-controlled robotic arm or device.

Further, with the channels as guides for placement of the conduits, measurements of locations for the conduits are unnecessary. Also, conduits may be installed with greater accuracy as to desired locations for the conduits with the use of the channels as guides for connecting the conduits to the composite panels. Further, fewer components are needed to install these conduits. Two-sided tape and fasteners are unnecessary with conduits manufactured in accordance with an illustrative embodiment.

Figure 12:
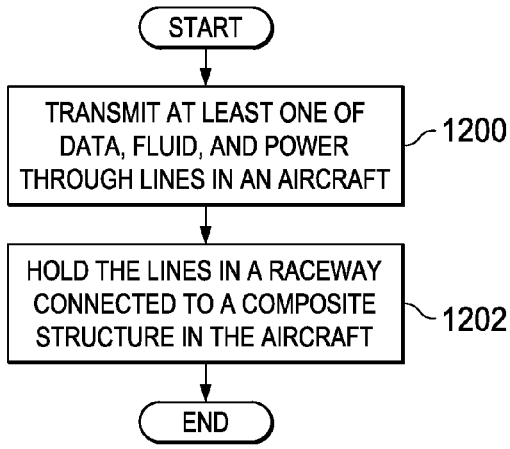
FIG. 12 is an illustration of a flowchart of a process for operating an aircraft in accordance with an illustrative embodiment.

Turning next to FIG. 12, an illustration of a flowchart of a process for operating an aircraft is depicted in accordance with an illustrative embodiment. The process may be implemented in aircraft 100 in FIG. 1 in these illustrative examples.

The process begins by transmitting at least one of data, fluid, and power through lines in an aircraft (operation 1200). Thereafter, the process holds the lines in a raceway connected to a composite structure in the aircraft (operation 1202), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1004 and operation 1006 may be performed in reverse order. In some illustrative examples, these two operations may be performed at the same time. The different operations in FIG. 9 may be performed automatically by designer 702 in FIG. 7 in some illustrative examples. In other examples, these operations may be performed in conjunction with user input from a human operator.

Turning now to FIG. 13, an illustration of a data processing system is depicted in accordance with an illustrative embodiment. Data processing system 1300 may be used to implement a computer in computer system 708 in FIG. 7, a computer in numerical control machine tool 804 in FIG. 8, or some other suitable component used in the different illustrative embodiments. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318. Alternatively, program code 1318 may be transferred to data processing system 1300 using computer readable signal media 1326. Computer readable signal media 1326 may be, for example, a propagated data signal containing program code 1318.

For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code 1318.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 may be fabricated or manufactured in a manner similar to components or subassemblies produced while aircraft 1500 is in service 1412. As yet another example, one or more apparatus embodiments, method embodiments, or a combination thereof may be utilized during production stages, such as component and subassembly manufacturing 1406 and system integration 1408.

For example, a conduit system may be designed using design environment 700 in FIG. 7. The conduit system may be manufactured and installed on composite panels in manufacturing environment 800 in FIG. 8.

One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500. Conduits in a conduit system may be installed or removed while aircraft 1500 is in service 1412 or during maintenance and service 1414. Further, while aircraft 1500 is in service 1412, the conduit system may carry lines for aircraft 1500. Power and data may be distributed through the lines held in the conduit system in aircraft 1500 during the operation of aircraft 1500.

One or more illustrative embodiments provide a conduit system that reduces the time and effort needed to install conduits to hold lines, such as wires, cables, optical fibers, or other types of lines. In one or more illustrative embodiments, channels may be formed in the composite panel as part of manufacturing the composite panel. In this manner, an installer may connect conduits to the composite panel by engaging connectors extending from the conduits to the channels. This type of connection avoids the need to measure and mark locations for conduits.

Further, with one or more illustrative embodiments, the number of components needed to install conduits also may be reduced. With the illustrative embodiments, components, such as tape, fasteners, and other components, may be avoided or reduced. Further, the conduits in one or more illustrative embodiments may be removed and reused more easily as compared to currently used conduits that employ tape and fasteners.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. An apparatus comprising:
a conduit, said conduit comprises:
an elongate housing comprising a top wall, a bottom wall, and a side wall, the elongate housing defining an outer boundary of a channel and configured to hold a number of lines in the channel; and
a first pair of connectors extending from the bottom wall of the elongate housing, wherein the first pair of connectors is configured to engage a first pair of channels formed in a surface of a panel of an interior structure of an aircraft such that the elongate housing of the apparatus is connected to the panel of the interior structure of the aircraft, and
wherein the bottom wall of the elongate housing is configured to bow such that each connector of the first pair of connectors assumes an orientation that allows an entry of the first pair of connectors into the first pair of channels.

2. The apparatus of claim 1, wherein the first pair of connectors is configured to enter the first pair of channels formed in the surface of the panel of the interior structure of the aircraft and engage an outer layer of material within each channel of the first pair of channels.

3. The apparatus of claim 2, wherein each connector of the first pair of connectors comprises:
   a protruding structure configured to enter one of the channels of the first pair of channels formed in the surface of the panel of the interior structure of the aircraft and engage the outer layer of material within the channel of the first pair of channels.

4. The apparatus of claim 2, wherein the panel of the interior structure of the aircraft is a composite panel and wherein the outer layer of material is a face sheet for the composite panel.

5. The apparatus of claim 2, wherein the panel of the interior structure of the aircraft is a composite panel and wherein the outer layer of material is a first face sheet and wherein the composite panel comprises:
   the first face sheet;
   a second face sheet; and
   a core located between the first face sheet and the second face sheet.

6. The apparatus of claim 1, wherein the elongate housing is comprised of a flexible material, wherein a first lengthwise edge of a wall of the elongate housing is configured to engage a second lengthwise edge of another wall of the elongate housing to close a lengthwise gap in the elongate housing that extends across the length of the channel, and wherein the first lengthwise edge and the second lengthwise edge are located between the top wall and the bottom wall.

7. The apparatus of claim 1, wherein the panel of the interior structure of the aircraft is a composite panel.

8. The apparatus of claim 1, wherein the elongate housing and the first pair of connectors form a raceway.

9. The apparatus of claim 1, wherein the interior structure of the aircraft is selected from one of a closet, a wall, and a ceiling.

10. The apparatus of claim 1, wherein the number of lines is selected from at least one of a wire, a power line, a data line, a cable, a fluid line, and an optical fiber.

11. The apparatus of claim 1, wherein the elongate housing is comprised of a material selected from one of a plastic, polyvinyl chloride, polypropylene, nylon, polyethylene, a metal, aluminum, a rigid material, and a flexible material.

12. The apparatus of claim 1, wherein the first pair of connectors is configured to engage the first pair of channels upon an insertion of the first pair of connectors into the first pair of channels.

13. The apparatus of claim 12, wherein the bottom wall of the elongate housing is configured to be held flat against the surface of the panel of the interior structure of the aircraft after the insertion and upon an engagement of the first pair of connectors with the first pair of channels.

14. The apparatus of claim 1, further comprising a second pair of connectors extending from the bottom wall of the elongate housing, wherein the second pair of connectors is configured to engage a second pair of channels formed in the surface of the panel of the interior structure of the aircraft.

15. A method of operating an aircraft, the method steps comprising:
   transmitting at least one of data, fluid, and power through lines in the aircraft; and
   holding the lines in a conduit connected to a panel of an interior structure of the aircraft, wherein:
      the conduit comprises an elongate housing comprising a to wall, a bottom wall, and a side wall, the elongate housing, and a pair of connectors extending from a side of the elongate housing,
      a first lengthwise edge of a wall of the elongate housing engages a second lengthwise edge of another wall of the elongate housing and closes a lengthwise gap in the elongate housing that extends across the length of the conduit, and wherein the first lengthwise edge and the second lengthwise edge are located between the top wall and the bottom wall,
      the pair of connectors engages a pair of channels formed in a surface of the panel of the interior structure of the aircraft such that the elongate housing is connected to the panel of the interior structure of the aircraft, and
      an outer surface of the bottom wall of the elongate housing disposed between the pair of channels is held flat against the surface of the panel of the interior structure of the aircraft.

16. The method of claim 15, wherein the pair of connectors enters the pair of channels in the panel of the interior structure of the aircraft and engages an outer layer of material within the pair of channels.

17. The method of claim 16, wherein a protruding structure of each connector of the pair of connectors enters one of the channels of the pair of channels formed in the surface of the panel of the interior structure and engages the outer layer of material within the other of the pair of channels.

18. The method of claim 15, wherein the elongate housing is comprised of a flexible material.

19. A method for installing a conduit onto a panel, the method steps comprising:
   identifying a pair of channels in a surface of the panel;
   inserting a pair of connectors extending from a bottom wall of an elongate housing of the conduit into the pair of channels in the surface of the panel, wherein the bottom wall of the elongate housing bows such that the pair of connectors assume an orientation that allows inserting the pair of connectors into the pair of channels in the surface of the panel; and
   fixedly engaging the pair of connectors with the pair of channels in the surface of the panel,
   wherein the bottom wall of the elongate housing flattens upon fixedly engaging the pair of connectors with the pair of channels in the surface of the panel, and
   wherein the elongate housing defines an outer boundary of the conduit and is configured to hold a number of lines in the conduit.

20. The method of claim 19, wherein fixedly engaging the pair of connectors with the pair of channels in the panel comprises:
   aligning the pair of connectors with the pair of channels before inserting the pair of connectors.

21. The method of claim 19, wherein the panel is a composite panel and wherein the pair of connectors enters the pair of channels in the composite panel and engages an outer layer of material within the pair of channels.

22. The method of claim 19, wherein the elongate housing is comprised of a flexible material, wherein a first lengthwise edge of a wall of the elongate housing engages a second lengthwise edge of another wall of the elongate housing and closes a lengthwise gap in the elongate housing that extends across the length of the conduit, and wherein the first lengthwise edge and the second lengthwise edge are located between a top wall and the bottom wall of the elongate housing.

* * * * *